April 17, 1951 R. J. SPALL 2,548,917
THREAD CHECKING DEVICE
Filed June 28, 1946 2 Sheets-Sheet 1

Inventor
RUDOLPH J. SPALL
By J. H. Church & H. E. Thibodeau
Attorney

April 17, 1951          R. J. SPALL          2,548,917
THREAD CHECKING DEVICE
Filed June 28, 1946                     2 Sheets-Sheet 2
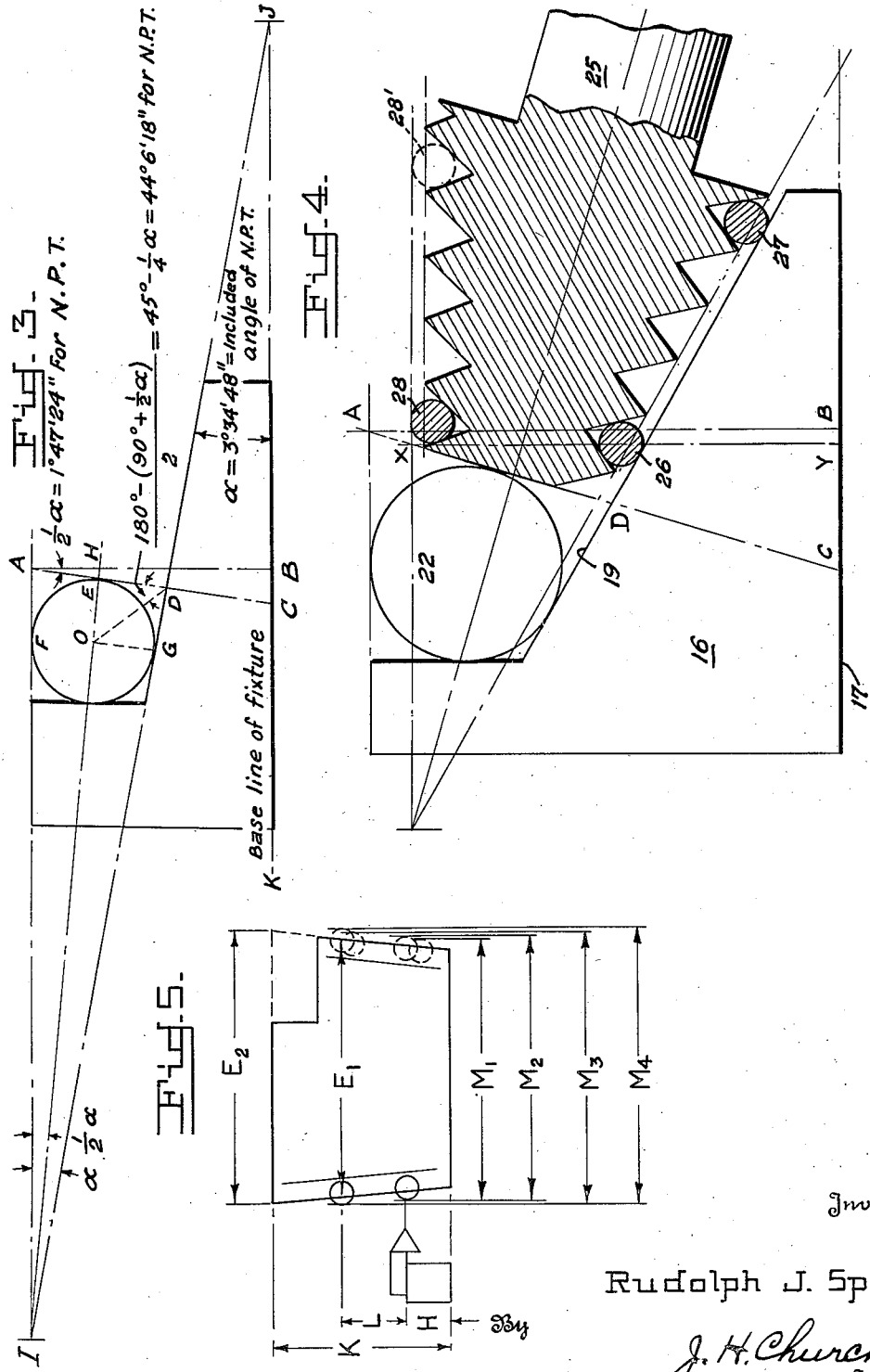
Inventor
Rudolph J. Spall
By J. H. Church
Attorney Patented Apr. 17, 1951

2,548,917

UNITED STATES PATENT OFFICE 2,548,917

THREAD CHECKING DEVICE

Rudolph J. Spall, Detroit, Mich.

Application June 28, 1946, Serial No. 680,107

2 Claims. (Cl. 33—174)

(Granted under the act of March 3, 1883, as amended April 30, 1928; 370 O. G. 757)

The invention described herein may be manufactured and used by or for the Government for governmental purposes, without the payment to me of any royalty thereon.

My invention refers to improvements in screw thread gages, particularly a taper thread checking fixture which may be used to measure a tapered thread plug for pitch diameter, and major diameter for small end and at the taper.

The complete inspection of a taper thread plug has always been a source of inconvenience for gage and screw manufacturers and facilities using them. The inspection method used most extensively throughout the United States is that method prescribed in National Bureau of Standards Hand Book No. H–28 which requires a great deal of time and skill on the part of the inspector. The accuracy of the method is dependent largely upon the inspector's eyes in fixing the point at which the reading is to be taken. It also has the disadvantage that an accurate reading must be made over two or three wires.

In a recent test made by an expert thread checker using the method prescribed in H–28 the time required to check a standard taper thread plug was 55 to 60 minutes. This check consisted of a complete measurement of the pitch diameter and major diameter. The method used necessitated a good mathematical background for the solution of the formula, and trigonometry and geometry for the triangulation of the major, minor and pitch diameters.

The difficulty of the aforementioned tests will be more readily appreciated if we consider the varied steps necessary, first to obtain the measurements required to be taken, and second the computations required applying these measurements to complete the inspection.

In the present art, as used in this test, the plug is placed on the table of the holddown fixture or measuring machine between centers and the thread measuring fixture is rotated through the helix angle. The image of the thread flank on the right hand end of the gage is then aligned with one of a plurality of 30 degree lines on a projection screen and the micrometer is advanced until the image of the flank of the next thread is aligned with the same 30 degree line when the reading of the micrometer's advance is read. The tapered distance per inch is divided by two, multiplied by the lead, and the result multiplied by the tangent of the half angle of the thread. This quantity is added to the difference in micrometer readings to determine the lead from first to second thread.

The next step involves measuring the pitch diameter and taper, and before proceeding both faces of the plug must be checked for perpendicularity since the plug must be mounted accurately vertical to avoid great errors when observations are made. To establish the diameter with reference to one end, or a given point along the axis of the plug, the wire used to measure the pitch diameter must be placed at an exact known distance from the front face of the plug. This is accomplished by placing a conical gage plug accessory, having an included angle equal to that of the thread, on a stack of gage blocks, and rotating the point of the accessory until its fits exactly between two threads. The proper location is not determinable by feel, but by sighting through the threads until it is noted that the conical point shuts out light on both threads when it is pushed forward into the threads. This point is marked for later spacing of the measuring wire. It is obvious that the determination of this locating mark is an operation involving tedious exactness and eye-strain.

The gage is next set up in the holddown fixture and placed between the anvils of the measuring device so that the mark is directly opposite one of the anvils, and once this position has been established it is important that the gage be not rotated until all measurements have been completed.

One of a set of standard measuring wires is then placed under the locating mark and two readings over the wire are taken, one with another wire on the opposite side placed one half thread pitch lower than the fixed wire, and the other with a wire placed one half thread pitch higher than the fixed measuring wire. The fixed wire is removed and reinserted between the thread flanks at a point near as possible to the back face of the gage and two readings are again taken as before.

The computations necessary to figure the pitch diameter and taper from the above measurements may best be explained and understood by reference to Figure 5 of the accompanying drawings and the following formula in which:

T = the inclination of the taper per inch;
$p$ = the thread pitch;
$n$ = the number of threads;
L = $np$;
$E_1$ = the pitch diameter;
$E_2$ = the pitch diameter at the large end of the gage;
C = the wire constant for $p$.

The values of M1, M2, M3, M4, H and K are given, and the value of $p$ can be found in standard tables of thread elements, or by dividing one by the number of threads per inch. The following relationships are used for calculating T, E1 and E2:

$$T = \left(\frac{M_3+M_4}{2} - \frac{M_1+M_2}{2}\right) \div L$$

$$E_1 = \frac{M_3+M_4}{2} - C$$

$$E_2 = (K-L-H)T + E_1$$

The method used at present for determining the major diameter is equally involved. To perform this operation gage blocks are placed over the thread crests and measuring is done across them in the same manner used to measure the tapered plugs, except that a factor to allow for the thickness of the gage blocks, $2t \sec A$, must be subtracted from the overall reading to obtain the formula for finding of the diameter of the plug at the base, or at any point level with the stack of gage blocks used to support the rolls. This formula is:

$$D = D_1 - 2r\left(1 + \cot\frac{90°-A}{2} - 2t \sec A\right)$$

in which

D=major diameter at the small end of the gage,
$t$=thickness of the gage blocks,
$r$=radius of the measuring rods,
$D_1$=overall measurement over the rolls,
$A$=half angle of taper of the plug, The value of A can be computed from the overall measurements by use of the formula:

$$\frac{D_2-D_1}{2h} = \tan A$$

in which $D_2$ and $D_1$ are overall measurements over the rolls on two different heights of stacks of gage blocks, $h$ is the difference in heights of the stacks of gage blocks and A half the angle of the taper.

It is readily to be seen that there are great possibilities for error in the involved measurements, and the slow and laborious calculations are required in using this present method.

In contrast, in an identical test made by the same thread expert using my invention, the taper thread plug was completely inspected in four minutes and forty-five seconds, saving at least fifty minutes time over the method generally used. The use of my invention, however, is not limited to employment by an expert, and an inexperienced employee with a general knowledge of the methods of thread inspection and a background of simple arithmetic can be taught to operate it efficiently and accurately in a few minutes.

My invention may also be used to check a second taper thread plug of the same size as the first one in the same ratio of time saving, and has been used in doing a complete job of checking the taper, out-of-roundness, and diameter of a standard taper minor diameter plug in two minutes; the same complete job required twenty-two minutes by actual test using the precision rolls and triangulation procedure.

My invention includes a ramp of such an angle to the base that the upper edge of a thread plug squared up on it will lie in a plane parallel to the base, and any deviation from that plane will be an error in the gage construction. A roll is used as a means of providing a surface to butt the end of the plug against in order to square it with the fixture and establish a line of tangency in a plane that passes along the end of the thread plug.

A principal object of my invention is to provide a tapered thread checking fixture whereby the pitch diameter, major diameter and taper may be measured without the use of the usual precision rolls, gage blocks and complex mathematical formulas.

An important object of my invention is to provide a tapered thread checking fixture including a ramp of such angle to the base that the upper edge of a thread plug squared up on it will lie in a plane parallel to the base, and a roll secured to the fixture to square the thread plug on the fixture.

Another object of my invention is to provide a tapered thread checking fixture in which all eyestrain in locating the exact point for making measurements of pitch dameter is eliminated.

A further object of my invention is to provide a tapered thread checking fixture in which the time required to completely inspect the pitch diameters and taper of a tapered thread plug or the taper of a tapered plain plug is greatly reduced.

A still further object of my invention is to provide a tapered thread checking fixture which is accurate, and in which all guess work and human error elements are eliminated.

Another further object of my invention is to provide a tapered thread checking fixture which is simple to manufacture and use, and one the use of which is easily taught, thereby saving time in training operators.

Other objects and aims of my invention will become apparent during the course of the following specification, and accompanying drawings, forming part of the specification, in which like numerals are used to designate like parts throughout the specification and drawings.

In the drawings:

Figure 3 is a geometric layout for derivation of proof of value of the constant of the fixture which is represented by the length of the line CD in Figures 3 and 4.

Figures 2, 6:
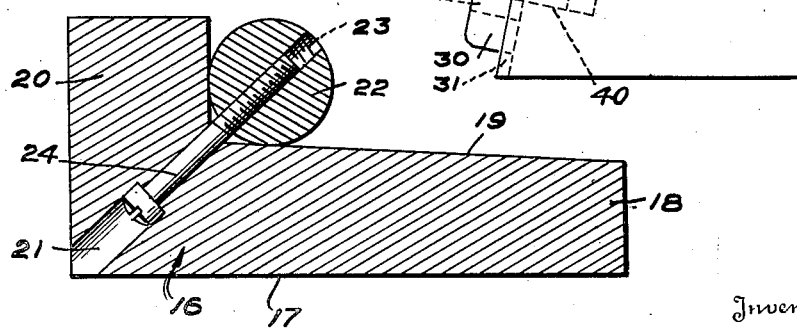
Figure 2 is a longitudinal section through the assembly of my invention, showing the taper fixture, the roll, and the method of securing the roll on the ramp of the fixture.

Figure 4 is an enlarged fragmentary sketch of my taper checking fixture illustrating its use, the tapered thread plug and thread wires being shown in section, non-truncated sharp V threads and enlarged angle of taper being used to clarify description, Figure 5 illustrates the method usually used at present for computing pitch diameter and taper of a taper threaded plug, and, Figure 6 illustrates a modified form of my invention.

Figure 1:
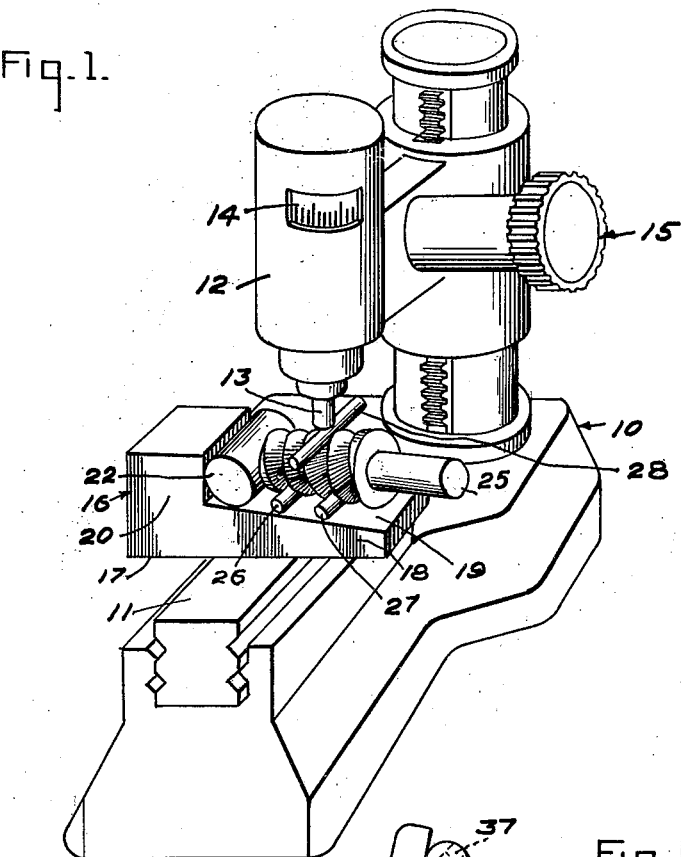
Figure 1 is a perspective view of the assembly of my invention in place in a standard measuring machine, with a tapered thread in place and thread wires in a checking position.

Referring now to the drawings, particularly to Figures 1 and 2, the numeral 10 designates generally a standard measuring apparatus comprising an adjustable flat surfaced anvil 11, a vertical comparator 12, the said comparator 12 being provided with a small dependent spindle 13 having a flat face parallel to the said anvil 11, and a registering dial 14. The apparatus 10 has means for translating the said comparator 12 up and down vertically relative to the object to be measured, and these means may consist of the manually operated mechanism illustrated and represented generally by the numeral 15, or any other convenient electrical or mechanical means for accomplishing the same purpose. Since all of these operating means are well known in the art, they are not described in detail.

My invention provides a fixture 16, substantially L-shaped, made of hardened tool steel, the lower surface 17 of the longer leg 18 being a precision flat surface serving as a base for the fixture 16 when the said fixture is placed on the anvil 11. The upper surface 19 of said leg 18 is formed as an inclined plane or ramp defining a dihedral angle with the said lower surface 17, the angle alpha built into the fixture being equal to the included angle alpha for the specific taper to be checked. In Figures 3 and 4, and in the data to be hereinafter presented showing proof of the value of the constant DC, alpha is the included angle of the National Pipe Taper, 3° 34′ 48″. The opposed sides of the shorter leg 20 form vertical planes normal to the plane of surface 17. The fixture 16 is bored and counterbored intermediate its sides at its turned up end to provide a bore 21, as shown in Figure 2, for a purpose which will be later explained.

The numeral 22 designates a cylindrical roll of a length approximately equal to the width of the fixture 16. The roll 22 is also made of hardened tool steel, and must not be tapered or out-of-round. The roll 22 is provided with an internally threaded diametrical hole 23 to receive a headed screw 24 positioned in the aforementioned bore 21 of the fixture 16 to secure the said roll 22 on the ramp 19 adjacent the short leg 20, the plane of the ramp 19 and of the inner surface of the said leg 20 being tangential to the said roll 22 at their respective contact points.

The roll 22 is used as a means of providing a surface against which the end of a tapered plug 25 can butt while the said plug is being inspected, in order to square the said plug 25 relative to the fixture 16 and establish a line of tangency in a plane that passes along the end of said plug 25. The small end pitch diameter and the small end major diameter of the said plug lie in this plane which is represented by the line AC on Figures 3 and 4.

Roll 22 should be of proper size to contact the face of the tapered plug 25 near its center in order to eliminate the effect of any possible error in the perpendicularity of the plug face to the plug axis. It has been found that a set of three rolls of one inch, one-half inch and one-quarter inch diameter, respectively, will measure any given tapered plug in normal range.

Referring now to Figures 3 and 4, the line CD represents a "fixture constant" and would be marked on each fixture for all sizes of rolls commonly used. Its derivation is very simple, since the height AB is readily measured, and the angle alpha and diameter of the roll are known. Referring to Figure 3:

$DE = EA = OE \cot 44° 6′ 18″$
$AC = AB \sec 1° 47′ 24″$
$DC = AC - DE - EA$
$DC = AB \sec 1° 47′ 24″ - 2OE \cot 44° 6′ 18″$ Referring now to Figure 4, the manner in which my invention is used is as follows:

Select the roll 22 whose diameter is closest to the diameter of the small end of the plug to be checked and screw it in place on the fixture 16. This roll must be of such size that the small end of the plug will have sufficient bearing area to square the center line of the plug with the fixture and cause the plane of the small end to fall on the constant check line CDA. Place two wires, 26 and 27, having a known constant for a given thread, under the plug 25 far enough apart to maintain a base for supporting the plug and rest the assembly on the ramp 19, pushing the small end of said plug tightly against the roll 22. It is very important that the small end face of the plug remain fully in contact with the roll during the entire measurement, and a slight smear of grease or vaseline will keep wires 26 and 27 from rolling on the ramp and will not affect the measurement.

The numeral 28 indicates a thread measuring wire having a known constant for a given thread. The so called "best-wire diameter" is selected for wires 26, 27 and 28 for the particular thread being checked, the value of the constant for it being given on the label of their package or it can be calculated using known formulas. This wire is similar to the measuring wires used in the method taught in the above mentioned Hand Book H–28. The measuring wire is placed between the threads at the top of the plug nearest the small end thereof and the distance from the top of the wire to the bottom of the fixture is read on the indicating dial 14. Measurements are taken near the front, center and back of the plug, and the plug is rotated for additional measurements which would indicate if the plug was out-of-round.

The sum of the value of the wire constant, the value of the pitch diameter (given on the drawing of the plug to be checked), and the computed value of CD (shown on the fixture) multiplied by the cosine of ½ alpha (alpha being the included angle of the fixture and tapered plug), gives the perpendicular distance from the top of the wire to the base of the fixture, shown at XY in Figure 4. The difference between this product and the actual height as indicated on the dial 14 is a measure of the amount of error in the plug.

When the wire 28 is moved to the position indicated at 28′ and readings are compared with those taken at the small end, any error in the taper of the plug will become evident.

Measurements of major diameter and minor diameter of the plugs are accomplished on the fixture in the same manner as described for determining the pitch diameter except that the thread wires are omitted and the plug is set directly on the surface of the ramp.

Figure 3 shows a geometric lay-out for deriving proof of the value of the constant CD, the standard National Pipe Taper being used as an example. In the diagram construction, the line AI is drawn parallel to the line JK and tangent to the roll at F. The line of plane on the ramp is extended to intersect the parallel lines AI and JK at I and J respectively. The angle JIA is bisected and the bisecting line extends through the center of the roll at O. The line AC is perpendicular to IO extended, and tangent to the circumference of the roll at E. From the point A the line AB is dropped perpendicular to JK, intersecting the line IO extended at H. The radius OG is drawn perpendicular to IJ at the point of tangency therewith, and the extended radius OD bisects the quadrilateral EOGD and the angle EDG.

In the layout:

Right triangle ABC and IAH are similar since all corresponding sides are perpendicular to each other.

Hence, the angle CAB equals the angle AIH, which is ½ of the angle IJK (alpha).

Since the angle DEO is a right angle by construction, in the triangle IED the angle EDI is equal to 180 degrees minus 90 degrees minus ½ alpha, or 90 degrees minus ½ alpha.

Angle EDO equals angle ODI or ½ angle EDI, and hence one-half of the difference, 90 degrees minus ½ alpha, or 45 degrees minus ¼ alpha.

DE is equal to OE cot (45 degrees minus one-quarter alpha) or $r$ cot (45 degrees minus ¼ alpha), in which $r$ is the radius of the roll 22.

DE equals EA; and AD equals DE plus EA, or 2DE, or $2r$ cot (45°−¼ alpha).

Hence, AD equals $d$ cot (45°−¼ alpha), in which $d$ is the diameter of the roll 22.

AC equals AB divided by the cosine of ½ alpha, and one divided by the cosine of one half alpha is the secant of ½ alpha.

Therefore, AC equals AB sec ½ alpha, and DC equals AC minus AD.

By substitution, the general formula becomes:

DC equals AB sec ½ alpha minus $d$ cot (45 degrees minus ¼ alpha).

The value of DC for the National Pipe Taper is computed as follows. The National Pipe Taper is one inch in 16 inches, and forms an isosceles triangle with a one inch base and 16 inch altitude and included angle of taper alpha. Hence for N. P. T. the tangent of the ½ alpha equals ½ inch divided by 16 inches or .031250. One half alpha is 1° 47′ 24″, and alpha equals 3° 34′ and 48″.

The secant of ½ alpha is 1.0004882.

One quarter alpha is 0° 53′ 42″

45° minus one quarter alpha equals 44° 6′ 18″.

Cot 44° 6′ 18″ equals 1.0317398.

By substitution in the general formula, the value of DC for a National Pipe Taper becomes:

$$DC = 1.0004842 AB \text{ minus } 1.0317398 d$$

Values of DC for other tapers may be worked out similarly by substitution of the proper values of included angles and taper into the general formula.

In connection with the use of the measuring wires 26, 27 and 28, it is pointed out that the constant C of these wires as given on the package is double the perpendicular distance from the thread pitch line to a line drawn tangent to the circumference of the wire and parallel to the thread pitch line, making the value of the constant for each wire ½ C. Thus each wire has a diameter equal to the so called "best-wire diameter" when the device is used in checking or inspecting the pitch diameter of the threaded tapered plug. However, when the taper of the plug is checked, these wires need not have a diameter equal to the best-wire diameter, because in this case, referring to Figure 4, what is determined are the vertical distances of the wire 28, positioned in two or more threads, from the base of the device; and if these distances be equal, the taper of the plug is correct. Therefore, it suffices if all three wires 26, 27 and 28 have equal diameters, or that 26 and 27 have equal diameters with 28 having any diameter that will permit it to contact with the sides of the threads. The value of this ½ C for adding to the pitch diameter when checking or testing with the fixture described, if complete mathematical exactness is desired, should be ½ C multiplied by sec ½ alpha. However, for small angles, such as the National Pipe angle where alpha is 3° 34′ and 48″, the difference between ½ C and ½ C sec ½ alpha is so small that it can be neglected. Throughout the entire range of standard thread sizes this difference is so small that any error will fall into the fifth decimal place while in most ordinary gage measurements work is done only to the fourth decimal place.

A modified form of my invention is shown in Figure 6. In the modified form an adjustable bracket member 30 is substituted for the short leg 20, the said bracket 30 being adapted to be moved up and down in a keyway 31 provided in the larger end of the fixture 32, making it possible for the roll 33, supported on a shoulder 34 formed in said bracket and retained by a bolt 35 positioned in the aligned bores 36 and 37 in the said bracket 30 and said roll 33, respectively, to contact the front faces of all sizes of tapered plugs exactly in the center. Bracket 30 is also arranged with an elongated transverse slot 38 to provide passageway therethrough for a threaded bolt engaging within an internally threaded bore 40 in the fixture 32 and adapted to lock said bracket 30 to the fixture 32 in varying adjusted positions.

An advantage of the modified form lies in that one roll is required. This roll may be moved up and down to contact the face of any sized tapered plug exactly in the center. A further advantage lies in the fact that only one calibration number (CD) is needed for all sizes of plugs. In all other respects the fixture is laid out and functions in the manner already described.

Having thus described my invention, I claim:

1. A gaging device for tapered articles comprising a body having a bottom extremity defining a plane, a slant, planar, upper surface defining a dihedral angle with the said bottom plane, a vertical portion above the slant surface, having a planar face intersecting the slant surface in a line parallel to the line of intersection of said bottom plane and said slant plane, and a cylinder fixed to the body and tangent to said slant plane and the planar face of the vertical portion.

2. A gaging device for tapered articles comprising a body having a bottom extremity defining a plane, a slant, planar, upper surface defining a dihedral angle with said bottom plane, a vertical portion above the slant surface having a planar face intersecting the slant surface in a line parallel to the line of intersection of said bottom plane and said slant plane, and a cylinder fixed to the body and tangent to said slant plane and the planar face of the vertical portion, said dihedral angle being equal to the included angle of the taper of the tapered articles.

RUDOLPH J. SPALL.

REFERENCES CITED

The following references are of record in the file of this patent:

UNITED STATES PATENTS

| Number | Name | Date |
|---|---|---|
| 454,516 | Brown | June 23, 1891 |
| 1,422,161 | Woodrow | July 11, 1922 |
| 1,593,753 | Darlington | July 27, 1926 |
| 1,769,129 | Graham | July 1, 1930 |
| 1,862,146 | Hoke | June 7, 1932 |
| 2,016,420 | Engst | Oct. 8, 1935 |
| 2,326,562 | Rensen | Aug. 10, 1943 |
| 2,359,018 | Balk | Sept. 26, 1944 |

OTHER REFERENCES

Publ.: Gages, Gaging and Inspection, 1st edition, 1918, D. T. Hamilton, The Industrial Press, New York, N. Y. Page 226.